(12) United States Patent
Lee

(10) Patent No.: US 9,888,443 B2
(45) Date of Patent: Feb. 6, 2018

(54) METHOD AND APPARATUS FOR MINIMIZING POWER CONSUMPTION DURING IDLE MODE IN WIRELESS COMMUNICATION SYSTEM

(75) Inventor: Kang-Gyu Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 1009 days.

(21) Appl. No.: 13/696,779

(22) PCT Filed: May 7, 2011

(86) PCT No.: PCT/KR2011/003418
§ 371 (c)(1),
(2), (4) Date: Nov. 7, 2012

(87) PCT Pub. No.: WO2011/139130
PCT Pub. Date: Nov. 10, 2011

(65) Prior Publication Data
US 2013/0070631 A1    Mar. 21, 2013

(30) Foreign Application Priority Data

May 7, 2010    (KR) .................. 10-2010-0042938

(51) Int. Cl.
*H04W 52/02*    (2009.01)
*H04W 68/00*    (2009.01)
(Continued)

(52) U.S. Cl.
CPC ... *H04W 52/0238* (2013.01); *H04W 52/0225* (2013.01); *H04W 68/00* (2013.01);
(Continued)

(58) Field of Classification Search
None
See application file for complete search history.

(56) References Cited

U.S. PATENT DOCUMENTS 6,240,288 B1    5/2001  Wan et al.
7,583,984 B2 *  9/2009  Sun ................. G06F 1/3228
                                              340/7.32
(Continued)

FOREIGN PATENT DOCUMENTS

JP    2007518371 A     7/2007
KR    10-2009-0074991   7/2009

OTHER PUBLICATIONS

International Search Report dated Jan. 2, 2012 in connection with International Patent Application No. PCT/KR2011/003418.
(Continued)

*Primary Examiner* — Ayaz Sheikh
*Assistant Examiner* — Faiyazkhan Ghafoerkhan

(57) ABSTRACT

A method for minimizing power consumption of a terminal during a power saving mode operation in a wireless communication system includes acquiring synchronization using a frequency used in a first paging listen interval or a frequency selected in a first paging listen interval; measuring a signal quality based on the acquired synchronization; and according to the measured signal quality, determining a length of a wake-up interval for a second paging listen interval. Thus, the terminal operating in the idle mode can minimize the power consumption of the terminal through the efficient control of the synchronization acquisition overhead interval and the frequency reselection algorithm carried out based on and the channel change.

20 Claims, 10 Drawing Sheets

(51) Int. Cl.
*H04W 68/02* (2009.01)
*H04W 56/00* (2009.01)

(52) U.S. Cl.
CPC ............ *H04W 68/02* (2013.01); *H04W 56/00* (2013.01); *Y02B 60/50* (2013.01)

(56) References Cited

U.S. PATENT DOCUMENTS

| | | | | |
|---|---|---|---|---|
| 8,112,650 B2* | 2/2012 | Qing | ..................... | H04W 24/00 370/311 |
| 9,258,798 B2* | 2/2016 | Li | ..................... | H04W 68/02 |
| 2004/0043798 A1* | 3/2004 | Amerga | ............ | H04B 1/70753 455/574 |
| 2005/0153714 A1 | 7/2005 | Subrahmanya | | |
| 2007/0057767 A1* | 3/2007 | Sun | ..................... | G06F 1/3228 340/7.35 |
| 2007/0184836 A1* | 8/2007 | He | ..................... | H04W 52/0245 455/434 |
| 2007/0253399 A1* | 11/2007 | Deshpande | ............ | H04L 12/12 370/347 |
| 2009/0003255 A1* | 1/2009 | Mohanty | ............... | H04W 68/04 370/311 |
| 2009/0003285 A1* | 1/2009 | Mohanty | ............... | H04W 68/04 370/332 |
| 2009/0215473 A1* | 8/2009 | Hsu | ..................... | G06K 19/0701 455/458 |
| 2009/0264129 A1* | 10/2009 | Oguchi | ................ | H04W 48/20 455/436 |
| 2009/0280812 A1* | 11/2009 | Cheng | ................ | H04W 76/046 455/436 |
| 2010/0009712 A1* | 1/2010 | Kodama | .......... | H04W 36/0088 455/550.1 |
| 2010/0070786 A1* | 3/2010 | Qing | ..................... | H04W 24/00 713/321 |
| 2010/0093378 A1 | 4/2010 | Chin et al. | | |
| 2010/0103848 A1* | 4/2010 | Chin | ..................... | H04W 68/00 370/311 |
| 2010/0105449 A1 | 4/2010 | Shi et al. | | |
| 2010/0273512 A1* | 10/2010 | Wang | ................... | H04W 68/06 455/458 |
| 2010/0317374 A1* | 12/2010 | Alpert | ................. | H04W 68/02 455/458 |
| 2013/0070631 A1* | 3/2013 | Lee | ................... | H04W 52/0225 370/252 |

OTHER PUBLICATIONS

Written Opinion of International Searching Authority dated Jan. 2, 2012 in connection with International Patent Application No. PCT/KR2011/003418.

Korean Intellectual Property Office, "Notice of Preliminary Rejection," Application No. 10-2010-0042938, Nov. 9, 2016, 8 pages.

* cited by examiner

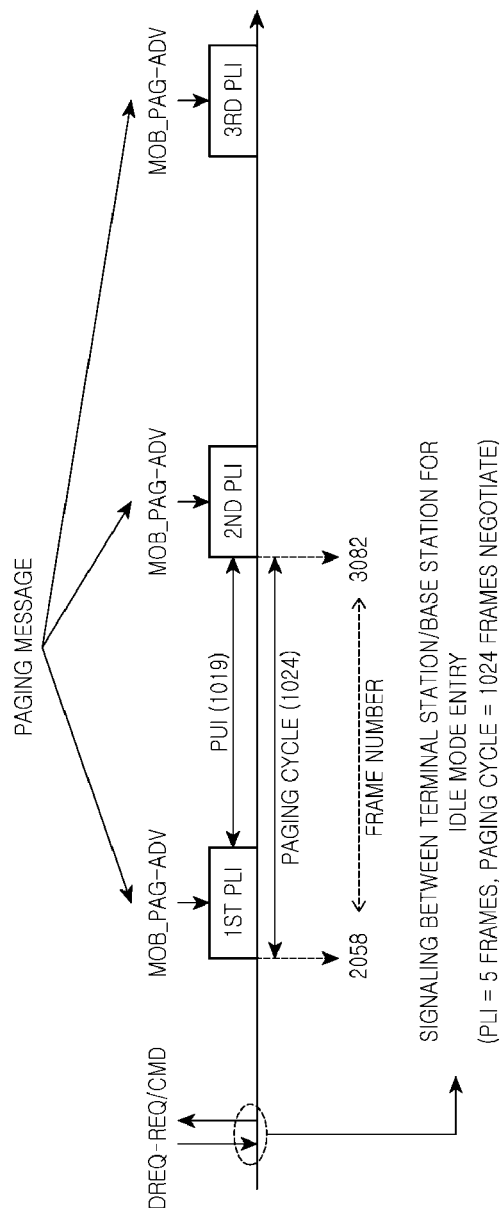
[Fig. 1]

[Fig. 2]
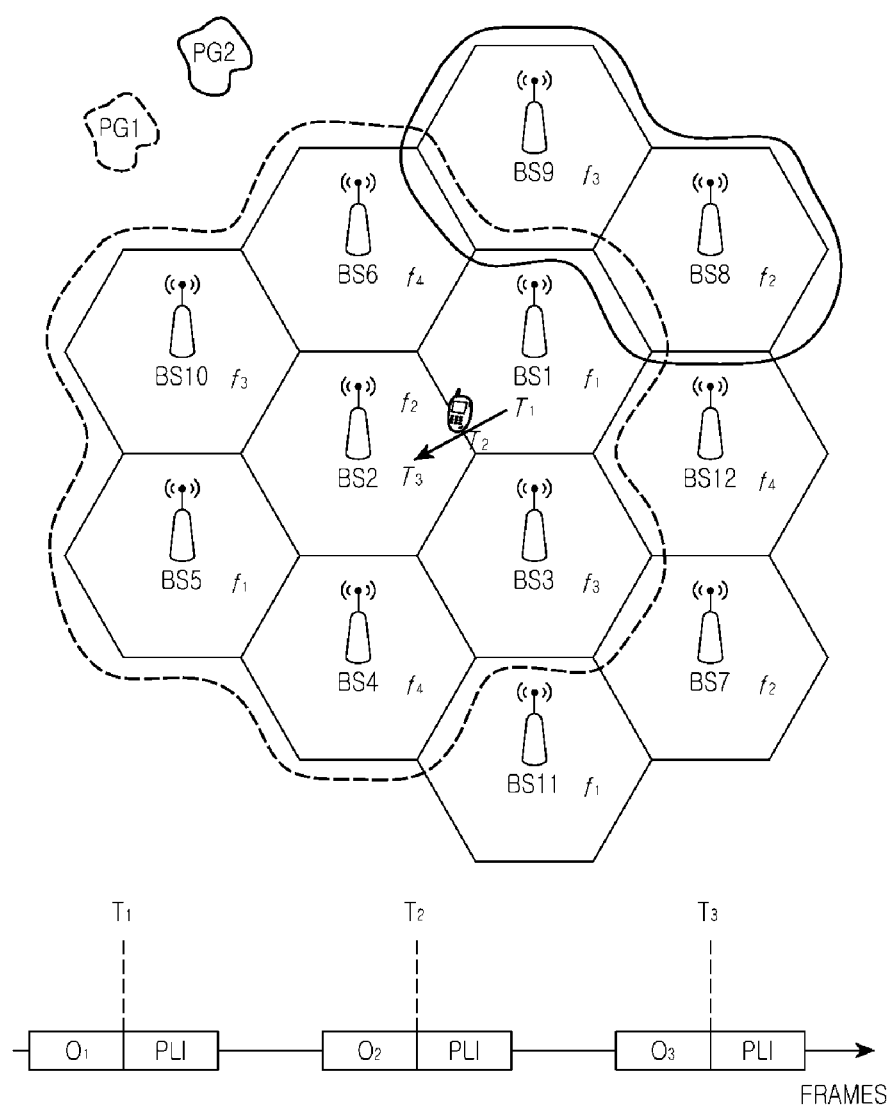

[Fig. 3]
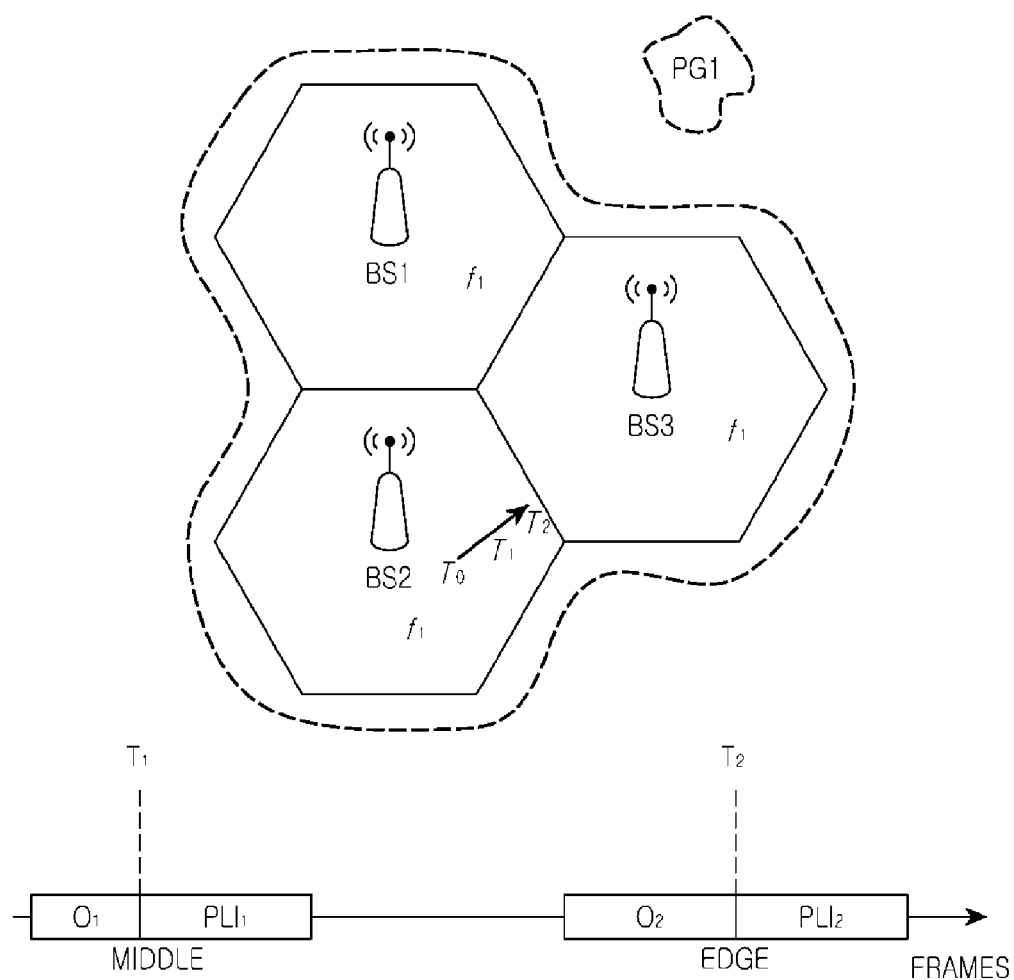

[Fig. 4]
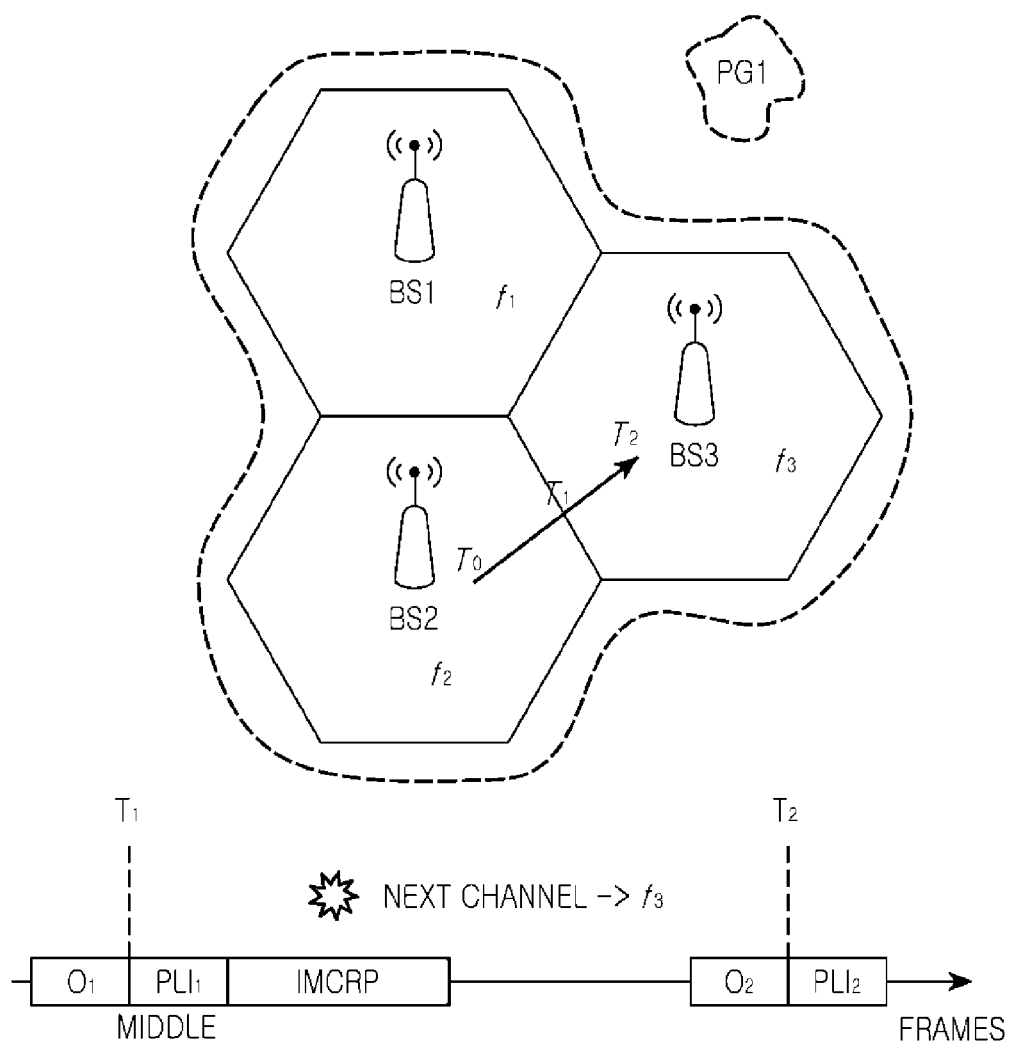

[Fig. 5]
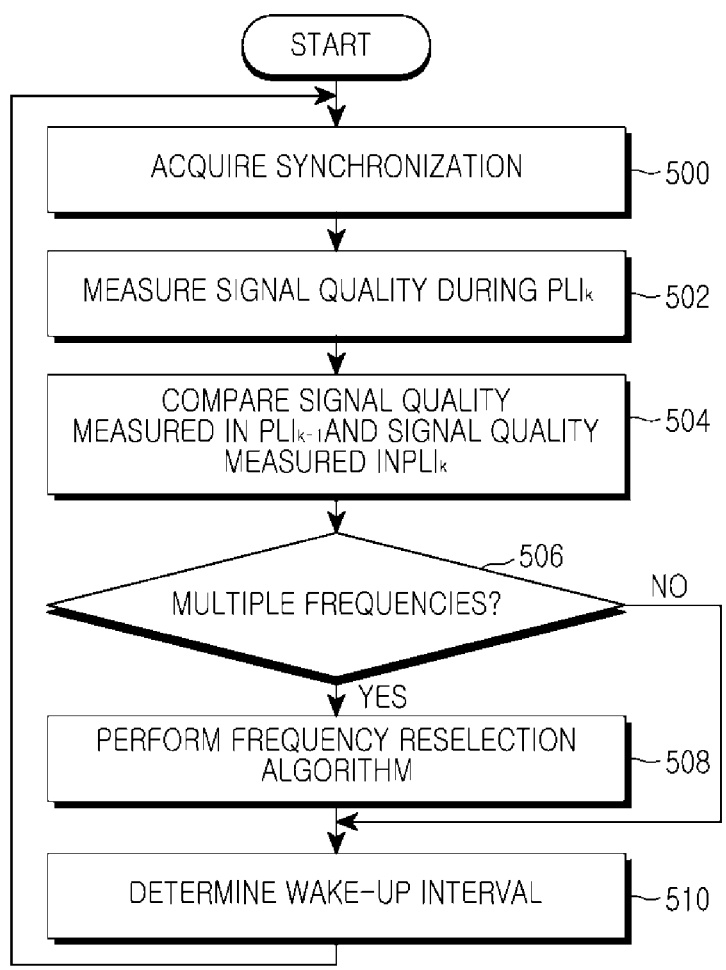

[Fig. 6]
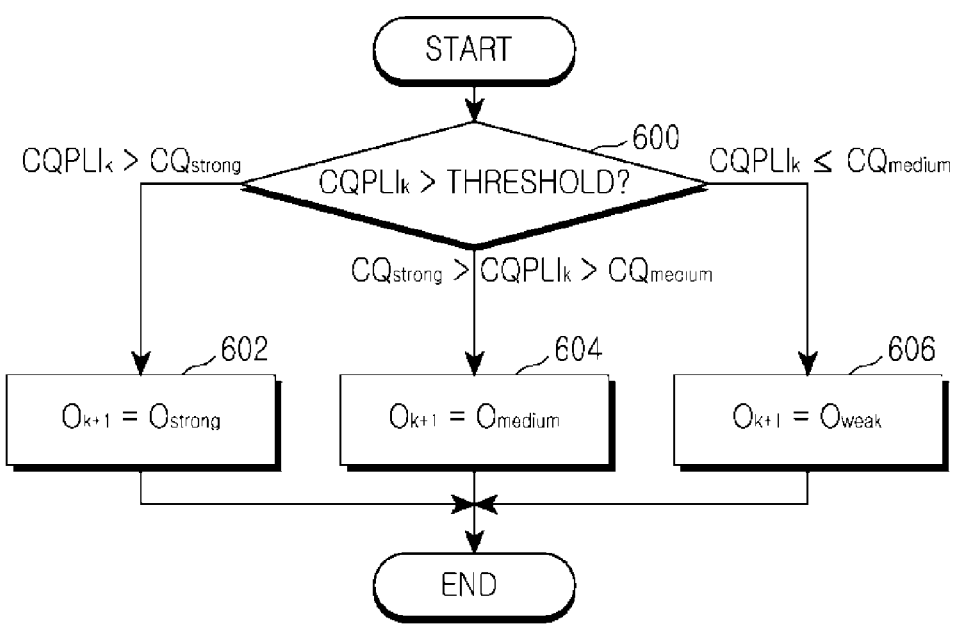

[Fig. 7]
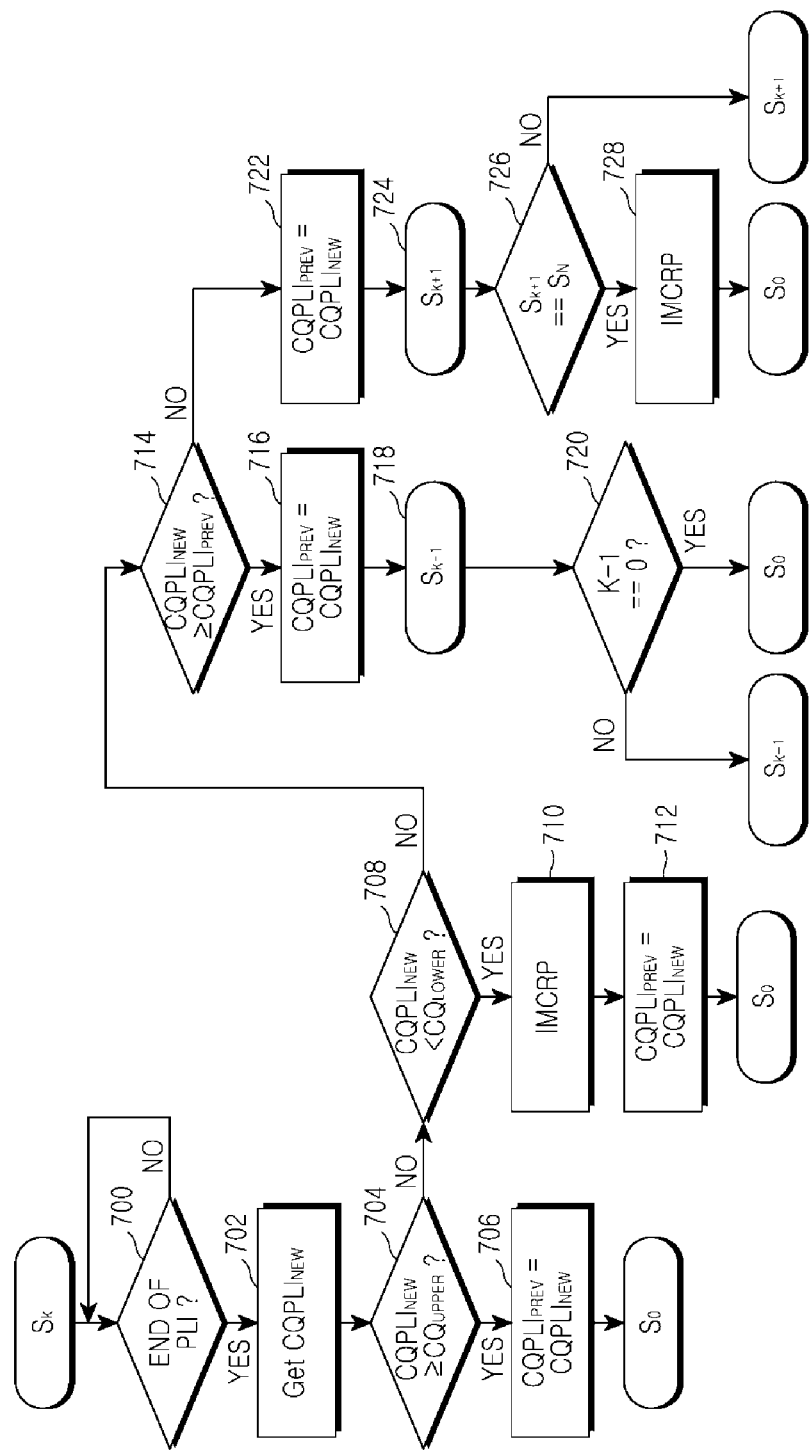

[Fig. 8]
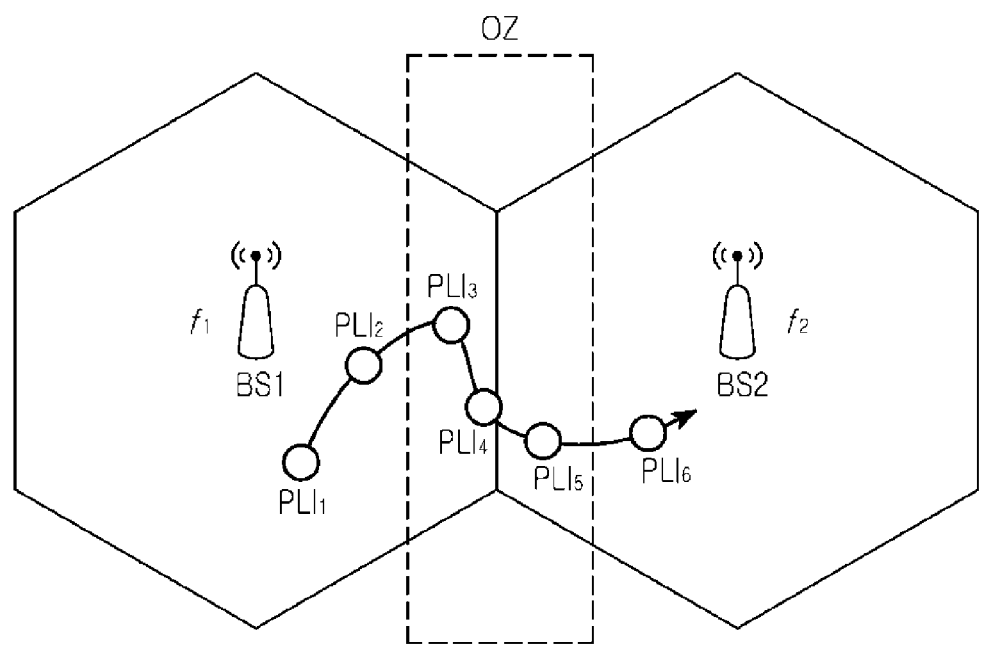

[Fig. 9]
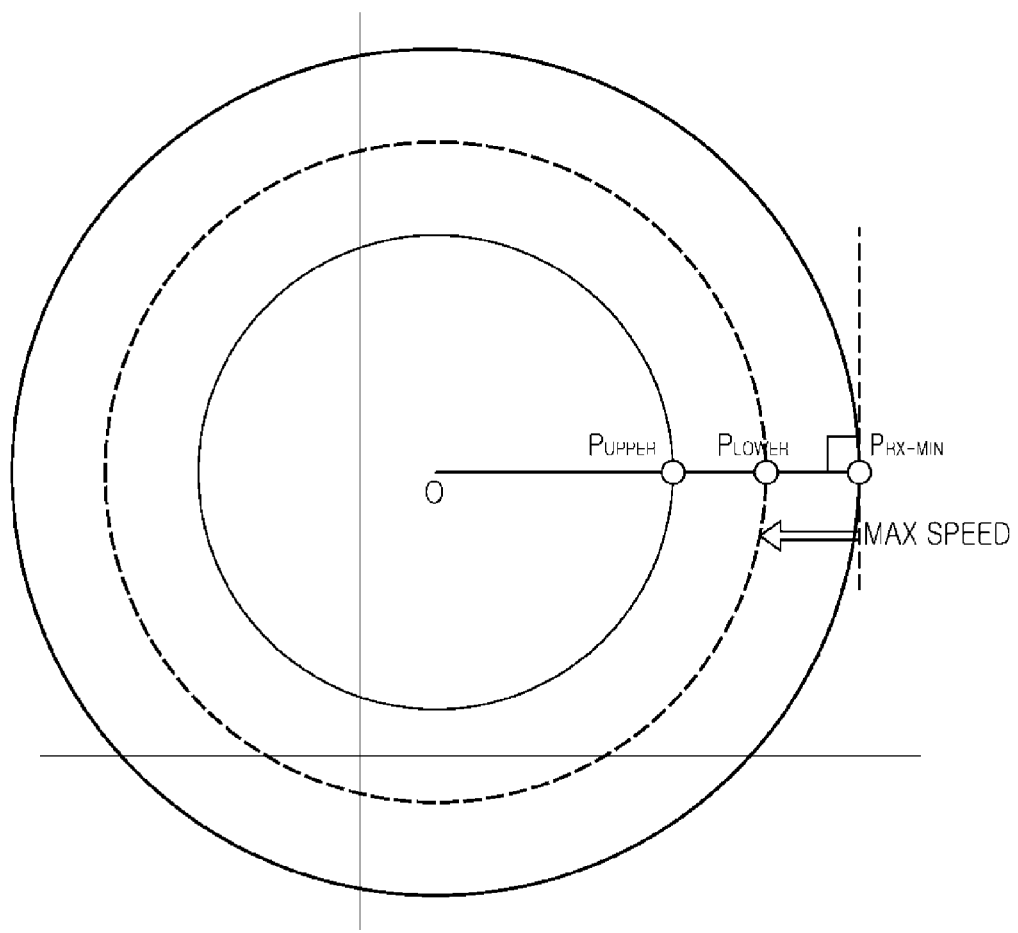

[Fig. 10]
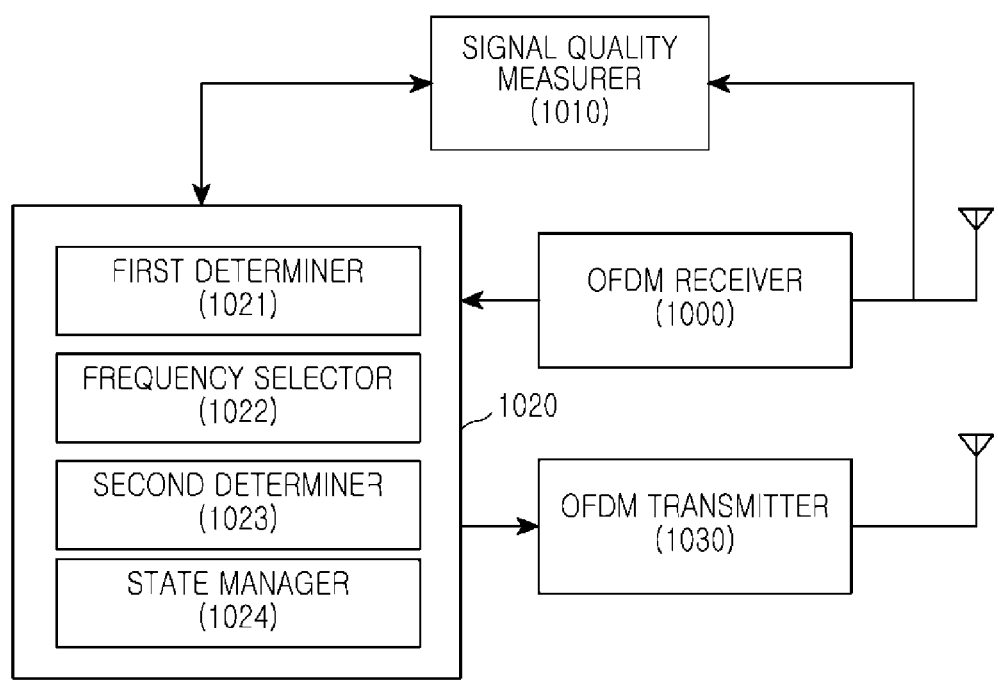

METHOD AND APPARATUS FOR MINIMIZING POWER CONSUMPTION DURING IDLE MODE IN WIRELESS COMMUNICATION SYSTEM

CROSS-REFERENCE TO RELATED APPLICATION(S)

The present application claims priority under 35 U.S.C. § 365 to International Patent Application No. PCT/KR2011/003418 filed May 7, 2011, entitled "METHOD AND APPARATUS FOR MINIMIZING POWER CONSUMPTION DURING IDLE MODE IN WIRELESS COMMUNICATION SYSTEM". International Patent Application No. PCT/KR2011/003418 claims priority under 35 U.S.C. § 365 and/or 35 U.S.C. § 119(a) to Korean Patent Application No. 10-2010-0042938 filed May 7, 2010 and which are incorporated herein by reference into the present disclosure as if fully set forth herein.

TECHNICAL FIELD

The present invention relates generally to an idle mode in a wireless communication system. More particularly, the present invention relates to a method and an apparatus for minimizing power consumption of a terminal during an idle mode in a wireless communication system.

BACKGROUND ART

Most of wireless communication systems including a Mobile WiMAX system perform a terminal power saving procedure according to characteristics and wireless environment of the corresponding system. For example, an idle mode and a sleep mode are introduced to minimize power consumption in the Mobile WiMAX system.

In a protocol negotiation procedure between a terminal and a base station to enter the idle mode, a Paging Listen Interval (PLI) and a Paging Unavailable Interval (PUI) are determined. To receive a paging message received from the base station in the PLI negotiated with the base station, the terminal changes some or all of components inactive during the PUI to an active mode before the PLI starts to thus receive the paging message in the PLI. Herein, to the receive the paging message in the PLI, the base station selected by the terminal is referred to as a Preferred Base Station (PBS).

Meanwhile, in the Mobile WiMAX system using a single frequency, a frequency selected in the previous PLI is used without considering frequencies of neighbor base stations when the terminal of the idle mode selects the PBS. Herein, the time required for the terminal in the corresponding idle mode to synchronize for the PBS selection based on a location of the terminal may vary according to downlink channel quality. That is, in the single-frequency network environment, a terminal close to the base station attains the good downlink signal quality (hereafter, referred to as a strong electric field) and requires a relatively short time in the synchronization to select the PBS, and a terminal in a cell boundary far away from the BS (hereafter, referred to as a weak electric field) requires a relatively long time in the synchronization to select the PBS.

In a network using multiple frequencies, to select the PBS, the idle-mode terminal needs to scan some or all of the frequencies defined in the corresponding network (hereafter, referred to as a frequency selection procedure) prior to the synchronization.

In recent, most of the wireless communication systems includings the Mobile WiMAX system define only an idle mode pattern (paging cycle, paging offset, etc.) between the terminal and the bases station and information required to update the location.

That is, conventional techniques merely describe a basic operation for receiving the paging message in the designated PLI, and do not define any operation for minimizing the power consumption of the terminal in the PUI, not in the PLI.

The power saving mode suggested in the mobile communication system provides a method of the corresponding mobile station to minimize its power in the PUI by combining the PLI and the PUI. However, each system does not define which operation the mobile station performs in the PUI. Accordingly, the method for enhancing the terminal power use efficiency in the power saving mode suggested by each system is the very important issue in terms of the individual terminal manufacturer.

Hence, a method and an apparatus for efficiently reducing the power consumption of the terminal during the idle mode in the wireless communication system are demanded.

DISCLOSURE OF INVENTION

Solution to Problem

To address the above-discussed deficiencies of the prior art, it is a primary aspect of the present invention to provide a method and an apparatus for reducing power consumption of a terminal during a power saving mode operation in a wireless communication system.

Another aspect of the present invention is to provide a method and an apparatus for determining a wake-up interval to reduce power consumption of a terminal during a power saving operation in a wireless communication system.

Yet another aspect of the present invention is to provide a method and an apparatus for reselecting a frequency to reduce power consumption of a terminal during a power saving operation in a wireless communication system.

Still another aspect of the present invention is to provide a method and an apparatus for minimizing unnecessary synchronization acquisition overhead and unnecessary frequency reselection procedure based on a signal quality measured by a terminal of a power saving mode during a paging listen interval in a wireless communication system.

According to one aspect of the present invention, a method for minimizing power consumption of a terminal during a power saving mode operation in a wireless communication system includes acquiring synchronization using a frequency used in a first paging listen interval or a frequency selected in the first paging listen interval; measuring a signal quality based on the acquired synchronization; and according to the measured signal quality, determining a length of a wake-up interval for a second paging listen interval.

According to another aspect of the present invention, a method for minimizing power consumption of a terminal during a power saving mode operation in a wireless communication system includes a controller for acquiring synchronization using a frequency used in a first paging listen interval or a frequency selected in the first paging listen interval; and a signal quality measurer for measuring a signal quality based on the acquired synchronization. According to the measured signal quality, the controller determines a length of a wake-up interval for a second paging listen interval; and according to the measured signal quality, selecting a frequency to use in the second paging listen interval.

According to yet another aspect of the present invention, a method for minimizing power consumption of a terminal during a power saving mode operation in a wireless communication system includes acquiring synchronization using a frequency used in a first paging listen interval or a frequency selected in a first paging listen interval; measuring a signal quality based on the acquired synchronization; according to the measured signal quality, determining a length of a wake-up interval for a second paging listen interval; and according to the measured signal quality, selecting a frequency to use in the second paging listen interval.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 1 is a diagram of an idle mode operation of a terminal in IEEE 802.16m according to an exemplary embodiment of the present invention;

FIG. 2 is an operation scenario of the idle mode terminal of a wireless communication system according to an exemplary embodiment of the present invention;

FIG. 3 is a scenario for determining a wake-up interval 0j in a wireless communication system using a single frequency according to an exemplary embodiment of the present invention;

FIG. 4 is a scenario for selecting a PBS through a frequency reselection procedure based on a signal quality in a wireless communication system using multiple frequencies according to an exemplary embodiment of the present invention;

FIG. 5 is a flowchart for reducing power consumption of the terminal when the terminal operates in the idle mode in the wireless communication system;

FIG. 6 is a flowchart for determining the wake-up interval in the wireless communication system according to an exemplary embodiment of the present invention;

FIG. 7 is a flowchart of an Idle Mode Channel Reselection Procedure (IMCRP) in the wireless communication system according to an exemplary embodiment of the present invention;

FIG. 8 is a state transition scenario for determining whether to perform the IMCRP according to movement of the terminal in the wireless communication system according to an exemplary embodiment of the present invention;

FIG. 9 is a diagram for determining CQupper and CQlower according to an exemplary embodiment of the present invention; and FIG. 10 is a block diagram of the terminal for reducing the power consumption of the terminal when the terminal operates in the idle mode in the wireless communication system.

Throughout the drawings, like reference numerals will be understood to refer to like parts, components and structures.

BEST MODE FOR CARRYING OUT THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method and an apparatus for reducing power consumption of a terminal when the terminal operates in an idle mode in a wireless communication system.

In particular, the present invention provides a method for reducing power consumption of a terminal by controlling a synchronization time (or a wake-up interval) using downlink channel quality change of a Preferred Base Station (PBS) in each Paging Listen Interval (PLI), and a method for efficiently reducing power consumption and guaranteeing a paging message detection success rate by controlling a frequency reselection procedure based on the channel quality change in a multi-frequency network.

Also, the present invention is an efficient power saving algorithm applicable in association with an idle mode procedure of mobile WiMAX and IEEE 802.16m network, may be applied in association with a sleep mode procedure of CDMA2000/WCDMA which is the 3G synchronous/asynchronous network, and may be applied to a terminal power saving process of a Long Term Evolution (LTE) system which is called the 4G system. That is, when the power saving procedure including the Paging Listen Interval (PLI) and the Paging Unavailable Interval (PUI) is defined as in the IEEE 802.16 standard and a signal quality criterion is defined, the present invention may interwork with the power saving standard of the corresponding system.

FIG. 1 illustrates a diagram of an idle mode operation of a terminal in IEEE 802.16m according to an exemplary embodiment of the present invention.

Referring to FIG. 1, a terminal requests the idle mode by transmitting a DREG-REQ message to the base station in order to enter the idle mode for the power saving, and the base station informs of whether the idle mode request of the terminal is permitted by transmitting a DREG-CMD message to the terminal. The DREG-REQ/DREG-CMD message includes idle mode pattern information, Paging Group (PG) information, and information about whether connection context set by the terminal and the base station before the entry to the idle mode is maintained. Herein, the PG includes one or more base stations, the base stations belonging to the same PG sustain the same idle mode pattern for the terminal, and the terminal does not perform a location update procedure when it moves to another base station in the same paging group. The idle mode pattern information includes a PLI length, a paging cycle, and a paging offset.

Referring to FIG. 1, through the DREG-REQ/DREG-CMD message transmission, the PLI is five frames and the paging cycle is determined as 1024 frames. During the paging cycle (the 1024-frame length), a first PLI, a second PLI, and a third PLI appear periodically, the first PLI starts from the frame number 2058, the second PLI starts from the frame number 3082, and the third PLI starts from the frame number 4106. The paging message is transmitted during the first PLI, the second PLI, and the third PLI. When there is no traffic data to transmit during the PUI, the corresponding terminal deactivates the corresponding components.

The frame number $N_{frame}$ which is the start point of the PLI, the paging cycle, the paging offset have the relation as expressed in the following Equation 1.

$$N_{frame} \text{moduloPAGING\_CYCLE=PAGING\_OFFSET} \quad (1)$$

That is, the modulo operation result of the paging cycle and $N_{frame}$ is the paging offset.

FIG. 2 illustrates an operation scenario of the idle-mode terminal of a wireless communication system according to an exemplary embodiment of the present invention.

Referring to FIG. 2, two paging groups PG1 and PG2 are present, the PG1 includes seven base stations BS1 through BS6 and BS10, and the PG2 includes two base stations BS8 and BS9. The PG1 and the PG2 are a mere exemplary embodiment. In the implementation, the PGs may be divided into two or more or two or less paging groups.

The terminal receives the paging message from the BS1 or the BS2 over each PLI according to the idle mode pattern determined in the idle mode entry procedure. Herein, a series of the operations of the terminal for changing the components deactivated during the PUI into the active state and selecting the PBS (e.g., the BS1 or the BS2) to receive the paging message in the predefined PLI is referred to as wake-up. In other words, to receive the paging message in each PLI, the terminal needs to wake up prior to the PLI.

In case of the paging not including an identifier of the terminal (referred to as a negative paging) in the corresponding PLI, the operation for deactivating some or all of its components during the PUI to reduce the power consumption from the end of the corresponding PLI is referred to as "power-down".

Meanwhile, in the respective PLIs starting from T1, T2, and T3, the terminal entering the idle mode at the BS1 selects the BS1 or the BS2 as the PBS and receives the paging message from the PBS. When the terminal performs signaling to enter the idle mode through the base station of their paging group, or when the terminal updates the location via the base station of their paging group, the base stations belonging to the same paging group provide the same paging information for the terminal. That is, when traffic for the terminal occurs, the base stations belonging to the same paging group transmit a positive paging over the PLI negotiated with the terminal. The terminal may receive the positive paging information even from a random base station belonging to the corresponding paging group over the pre-determined PLI.

In FIG. 2, the terminal operating in the idle mode wakes up and determines the PBS during the intervals indicated as $O_1$, $O_2$, and $O_3$. In so doing, since the time taken to wake up (referred to as wake-up time), which is not described in the standard, is definitely necessary for the PBS selection of the terminal and those intervals are for the synchronization compared to the PUI, the wake-up time have spend the relatively great power consumption.

When the PBS is selected through the wake-up procedure ($O_1$, $O_2$, $O_3$), the terminal confirms the paging message during the PLI. The terminal checks whether the positive paging takes place by determining whether contents of the paging message include its MAC address related information. Upon confirming the positive paging, the corresponding terminal performs the network re-entry and receives a downlink traffic packet. When confirming the negative paging, the terminal repeats the entry to the PUI through the power-down procedure again.

When the terminal of the idle mode completes the network entry procedure, the idle mode is automatically reset. Reasons of this network re-entry are divided largely into two, which are referred to as Mobile Originated Call and Mobile Terminated Call. In the Mobile Originated Call, the traffic packet is generated from an application of the terminal and the terminal re-enters the network regardless of the PUI or the PLI. That is, when the Mobile Originated Call takes place, it is common for the corresponding terminal to select the PBS through the wake-up procedure as quickly as possible and to perform the network re-entry procedure if it is not the PLI negotiated with the base station. In the Mobile Terminated Call, traffic and other messages are generated from other terminal or a network element and transmitted to the terminal through the paging message in the PLI negotiated between the terminal and the base station. In this Mobile Terminated Call, the terminal already receives the paging message from its PBS by selecting the PBS and thus performs the network re-entry procedure via the base station from which the paging message is received.

As for the shortcomings of the conventional technique, in network deployment with a single frequency, when the terminal sets every $0_j$ value to $O_{max}$ for the PBS selection and the corresponding terminal stays in the strong electric field, the synchronization may be acquired even by taking $O_{min}$ as the $O_j$ value but the unnecessary power is further consumed in selecting the $O_{max}$ value.

Herein, the $O_j$ is an overhead interval required for the terminal to acquire the synchronization by selecting the PBS during the $PLI_j$, the $O_{max}$ is a synchronization interval required to acquire the synchronization when the corresponding terminal travels in the weak electric field, and the $O_{min}$ is a synchronization interval required to acquire the synchronization when the corresponding terminal travels in the strong electric field. For example, when the terminal needs two frames to acquire the synchronization in the strong electric field and five frames to acquire the synchronization in the weak electric field, $O_{min}=2$ and $O_{max}=5$.

By contrast, when the terminal sets every $O_j$ value to $O_{min}$ for the PBS selection, the corresponding terminal may not acquire the accurate synchronization in the weak electric field area.

Meanwhile, in network deployment with multiple frequencies, when the terminal does not add the frequency reselection interval in every 0j interval for the PBS selection, the corresponding terminal should select the BS2 as the PBS at the $T_3$ as shown in FIG. 2. However, when the terminal does not reselect the frequency from $f_1$ to $f_2$ during the wake-up interval and maintains the frequency $f_1$ used by the BS1, the BS1, the BS5, or the BS11, rather than the BS2, may be selected as the PBS in the interval $O_3$. Accordingly, since the terminal has to receive the paging message from the BS1, the BS5, or the BS11, the paging message may be lost.

On the other hand, when the terminal reselects the frequency in every $O_j$ interval for the PBS selection, the corresponding terminal may consume the unnecessary power due to the frequency reselection operation in the strong electric field. That is, although the terminal scans the frequencies $f_2$, $f_3$ and $f_4$ in the strong electric field of the base station BS1, they are not better than $f_1$.

As stated above, in the environment where the terminal moves from the BS1 to the BS2 for the sake of the efficient use of the power as shown in FIG. 2, it is most appropriate for the terminal entering the idle mode to select the service frequency $f_1$ of the BS1 in the intervals $O_1$ and $O_2$ and to select the BS1, the BS1, and the BS2 as the PBS for receiving the paging message in the PLIs starting from $T_1$, $T_2$, and $T_3$ by selecting the B2 frequency $f_2$ in the interval $O_3$. In the strong electric field of each base station, the corresponding terminal may maximize the power efficiency by applying the value close to the $O_{min}$ as the length of the overhead interval for the wake-up and avoiding the frequency reselection operation if possible.

FIG. 3 illustrates a scenario for determining the wake-up interval in a wireless communication system using a single frequency according to an exemplary embodiment of the present invention.

Referring to FIG. 3, all of base stations BS1, BS2, and BS3 belonging to a first paging group utilize the same center frequency $f_1$ and a terminal operates in the idle mode at the BS2. When the terminal moves from the BS2 to the BS3 in the idle mode, it is assumed that the terminal lies in the strong electric field of the BS2 at the $T_0$, in the medium electric field at $T_1$, and in the weak electric field around the cell boundary of the BS2 and the BS3 at the $T_2$, and the best base station at the $T_0$, $T_1$, and $T_2$ is the BS2 rather than the BS3.

The PBS to be selected by the terminal in the $PLI_0$, the $PLI_1$, and the $PLI_3$ should be the BS2, and the lengths of $O_0$, $O_1$, and $O_2$ have the relation $O_0<O_1<O_2$. According to the present invention, the terminal determines the length of $O_0$ according to the signal quality of the BS2 measured in the idle mode entry, determines the length of $O_1$ according to the signal quality of the BS2 measured in the $PLI_0$, and determines the length of $O_2$ according to the signal quality of the BS2 measured in the $PLI_1$. Thus, since the downlink signal quality from the BS2 decreases in the terminal moves from the BS2 to the BS3, the synchronization acquisition overhead interval $O_0$, $O_1$, $O_2$ for the $PLI_k$ (k=0, 1, 2) gradually increases. In result, the power of the terminal may be used more efficiently because the relatively short overhead is applicable for the $PLI_0$ and the $PLI_1$. In addition, the length $O_0$, $O_1$ and $O_2$ of the overhead interval required per signal quality may be regulated in advance according to capabilities of each terminal, the wake-up interval is determined by considering the signal quality change based on the travel of the terminal, and thus the probability of the synchronization acquisition failure may be reduced.

FIG. 4 illustrates an operating for selecting the PBS through the frequency reselection procedure based on the signal quality in a wireless communication system using multiple frequencies according to an exemplary embodiment of the present invention.

Referring to FIG. 4, all of neighbor base stations BS1, BS2, and BS3 are assumed to have different center frequencies $f_1$, $f_2$, and $f_3$, and a terminal is assumed to enter the idle mode at the BS2 and travel to the BS3. Also, it is assumed that the terminal is placed in the medium electric field of the BS2 at the point $T_0$, in the weak electric field in the cell boundary of the BS2 and the BS3 at $T_1$, and in the medium electric field of the BS3 at the point $T_3$.

The PBSs to be selected by the terminal in the $PLI_0$, the $PLI_1$, and the $PLI_2$ are the BS2, the BS2, and the BS3 respectively, and the wake-up operation performed in the $O_2$ through Idle Mode Channel Reselection Procedure (IM-CRP) between the PLI1 and the PLI2 is performed based on the frequency $f_3$ of the BS3. Details of the IMCRP may conform to the implementation of each terminal manufacturer.

FIG. 4, which conceptually illustrates the determining of whether to perform the IMCRP suggested by the present invention, shows that the IMCRP operation is selectively fulfilled only in the $PLI_1$, rather than the $PLI_0$ and the $PLI_2$, according to the present invention.

FIG. 5 illustrates a flowchart for reducing the power consumption of the terminal when the terminal operates in the idle mode in the wireless communication system.

Referring to FIG. 5, in step 500, the terminal acquires the synchronization using the frequency used in the previous PLI, or using the frequency selected from the multiple frequencies at the end of the previous PLI. In other words, the terminal selects the preferred base station PBS which uses the frequency used in the wake-up interval determined in step 510, or the frequency selected from the multiple frequencies.

Next, after the synchronization is acquired, in step 502, the base station measures the signal quality of the PBS during the current PLI ($PLI_k$) and stores the value to the $CQPLI_k$. Herein, when the synchronization is not acquired, the corresponding $CQPLI_k$ value is stored as a predefined lowest signal quality value (e.g., $CQPLI_k=-103.75$ dBm). Herein, the signal quality CQPLI may be determined as Received Signal Strength Indication/Indicator (RSSI), Carrier-to Interference-plus-Noise-Ratio (CINR), Path Loss (PL), Signal-to-Interference-plus-Noise-Ratio (SINR), Ec/No, and so on.

Next, the terminal compares the $CQPLI(_{CQPLIk-1})$ measured during the previous $PLI(PLI_{k-1})$ with the CQPLI ($CQPLI_k$) value measured during the current $PLI(PLI_k)$ in step 504.

Next, the terminal determines whether the neighbor base stations use the multiple frequencies in step 506. For example, when the BS1, the BS2, and the BS3 use the different $f_1$, $f_2$, and $f_3$ respectively as shown in FIG. 4, the terminal proceeds to step 508. When the BS1, the BS2, and the BS3 use the same $f_1$ as shown in FIG. 3, the terminal proceeds to step 510.

In step 508, the terminal determines the state transition for determining whether to perform the IMCRP (the frequency reselection algorithm) based on the comparison result of CQPLIk−1 and CQPLIk, and performs the IMCRP according to the determined state transition. The IMCRP (Idle Mode Channel Reselection Procedure) is the procedure of the terminal operating in the idle mode for scanning the signal quality of the multiple frequencies defined in the corresponding network to select the frequency to scan in the wake-up interval of the next PLI in the network using the multiple frequencies. Herein, the frequency indicates the center frequency defined in the corresponding network.

For example, based on the comparison result of $CQPLI_{k-1}$ and $CQPLI_k$, the terminal determines whether it is A) a good signal region, B) a dynamic state transition region, and C) a state transition RESET region, and thus sets the next state base on the corresponding region as follows.

A) in the good signal region: set the next state value to $S_0$.

B) in the dynamic state transition region: according to the comparison result of $CQPLI_{k-1}$ and $CQPLI_k$, the terminal changes the next state $S_n \rightarrow S_{n-1}$ for UP and $S_n \rightarrow S_{n+1}$ for DOWN.

At this time, when n−1<0, the terminal sets $S_{n-1}=S_0$.

C) in the state transition RESET region: set the next state value to $S_{MAX}$.

The IMCRP shall be explained in detail in FIG. 7.

Next, the terminal determines the wake-up interval for the next $PLI_{k+1}$ interval in step 510. That is, in FIG. 3, the terminal determines the length $O_{k+1}$ of the overhead interval to apply to the next $PLI_{k+1}$ according to the current measured $CQPLI_k$ value. In FIG. 4, based on the comparison result of $QPLI_{k-1}$ and $CQPLI_k$, the terminal determines the length $O_{k+1}$ of the overhead interval to apply to the next $PLI_{k+1}$ according to the state transition for determining whether to perform the IMCRP. Yet, an initial value $O_0$ of the overhead interval is determined based on the signal quality of the base station to which the corresponding terminal conducts the signaling to enter the enter mode. The determination of the wake-up interval shall be elucidated by referring to FIG. 6.

FIG. 6 illustrates a flowchart for determining the wake-up interval in the wireless communication system according to an exemplary embodiment of the present invention.

Referring to FIG. 6, the terminal compares the current $QPLI_k$ and thresholds $CQ_{strong}$, $CQ_{medium}$, and $CQ_{weak}$ in step 600. When $CQPLI_k > CO$ the terminal sets $O_{k+1}=O_{strong}$ in step 602. When $CQ_{strong} > CQPLI_k > CQ_{medium}$, the terminal sets $O_{k+1}=O_{medium}$ in step 604. When $CQ_{medium} \geq CQPLI_k$, the terminal sets $O_{k+1}=O_{weak}$ in step 604. Herein, $Os_{trong}$, $O_{medium}$, and $O_{weak}$ ($O_{strong} < O_{medium} < O_{weak}$) are selected as the length of the overhead interval $0j+10_{j+1}$ for the next $PLI_{j+1}$ according to the time intervals (i.e., the wake-up interval) required to synchronize for the PBS selected for each PLI, and the $CQPLI_j$ value of the immediately previous $PLI_j$. At this time, $CQ_{strong}$, $CQ_{medium}$ and $CQ_{weak}$ values, which are the CQPLI values mapped to the respective overhead intervals, are determined based on the performance of each terminal. In the implementations, the number of the overhead intervals can be greater than three or smaller than three.

FIG. 7 illustrates a flowchart of the Idle Mode Channel Reselection Procedure (IMCRP) in the wireless communication system according to an exemplary embodiment of the present invention. The terminal is assumed to currently stay in the Sk state.

Referring to FIG. 7, when the current PLIk interval ends in step 700, the terminal determines the signal quality CQPLINEW measured during the current $PLI_k$ in step 702

Next, when $CQPLI_{NEW} \geq CQ_{upper}$ in step 704, the terminal sets $CQPLI_{prev}=CQPLI_{NEW}$ in step 706. In so doing, the terminal switches to the $S_0$ state. The $CQ_{upper}$ is the upper bound of the signal quality when the state transition can take place.

That is, the $S_O$, which is the good signal region, implies that the $CQPLI_k$ value measured by the terminal in the $PLI_k$ is better than $C_{upper}$. When the terminal enters the good signal region, the state defined by the present invention returns to the initial state $S_0$. During the $S_0$, the terminal does not perform the additional state transition and the IMCRP operation.

By contrast, when $CQPLI_{NEW} < CQ_{upper}$ in step 704, the terminal determines whether $CQPLI_{NEW} < CQ_{lower}$ in step 708. The $CQ_{lower}$ is a lower bound of the signal quality when the state transition can take place.

When $CQPLI_{NEW} < CQ_{lower}$ in step 708, the terminal reselects the frequency using the IMCRP in step 710 and sets $CQPLI_{prev}=CQPLI_{NEW}$ in step 712.

That is, the terminal is placed in the state transition reset region, and the state transition reset region implies that the $CQPLI_k$ value measured by the terminal in the PLIk gets worse than the $CQ_{lower}$. When the terminal enters this state, the terminal searches for a better frequency by performing the IMCRP. The terminal entering this region first conducts the IMCRP and then returns the next state to the S0 regardless of the previous state.

By contrast, when $CQ_{lower} \leq CQPLI_{NEW} < CO_{upper}$ in step 708, the terminal determines whether $CQPLI_{prev} \geq CQPLI_{NEW}$ in step 714.

When $CQPLI_{NEW} \geq CQPLI_{prev}$, the terminal sets $CQPLI_{prev}=CQPLI_{NEW}$ in step 716 and changes the state to $S_{k-1}$ in step 718. Next, $S_0$ when k−1=0 and $S_{k-1}$ when k−1≠0 in step 720.

By contrast, when $CQPLI_{NEW} < CQPLIprev$, the terminal sets $CQPLIprev=CQPLI_{NEW}$ in step 722 and changes the state to Sk+1 in step 724.

Next, $S_{k+1}$ when k+1≠$S_N$ in step 726. When k+1=$S_N$, the terminal performs the IMCRP in step 728 and changes the state to $S_O$. Herein, the $S_N$ denotes $S_{Nmax-1}$ of $S_0 \sim S_{Nmax-1}$ which are a set of the assumed states in the dynamic state transition region in the present invention.

That is, the operations after the step 714 correspond to the dynamic state transition region of the terminal. The dynamic state transition region implies that the $CQPLI_k$ value measured by the terminal in the $PLI_k$ lies between the $CQ_{upper}$ and the $CQ_{lower}$. The terminal entering this region determines whether to perform the IMCRP according to the intention of the present invention, and whether to perform the IMCRP is determined by the transited final state. The assumed set of the states according to the present invention is $S_0 \sim S_{Nmax-1}$, and $N_{max}$ denotes the total number of the state transitions. The terminal operations in this region are conceptually explained. The terminal entering this state changes the state from $S_n$ to $S_{n+1}$ when the $CQPLI_{ks}$ value measured most recently gets worse than $CQPLI_{k-1}$ measured just before, and changes the state from $S_n$ to $S_{n-1}$ when the $CQPLI_k$ value is better than $CQPLI_{k-1}$. In so doing, n−1≥0 is maintained. When the transited state is $S_{Nmax-1}$, the terminal performs the IMCRP and thus searches for the frequency providing the better signal quality.

FIG. 8 illustrates a scenario for determining whether to perform the IMCRP based on the state transition according to the movement of the terminal in the wireless communication system according to an exemplary embodiment of the present invention.

Referring to FIG. 8, the terminal assumes $N_{max}=4$ (S0~S3) as the number of the state transitions and the part indicated by $O_Z$ as the dynamic state transition region. The terminal transits to the good signal region $S_0$ during the $PLI_1$ and the $PLI_2$ and does not perform the frequency reselection procedure.

Next, the terminal enters the dynamic state transition region in the $PLI_3$ and enters the $S_I$ state. Next, the terminal continuously gets away from the BS1, passes through the $PLI_4$, and transits to the states $S_2$ and $S_3$ in the $PLI_5$. Since the state determined based on the $CQPLI_5$ at the end of the $PLI_5$ is $S_3=S_{Nmax-1}$, the terminal selects the frequency $f_2$ of the $BS_2$ as the frequency for conducting the wake-up in $O_6$ through the IMCRP execution.

Next, the terminal selects the BS2 as the PBS for the PLI6 by attempting the synchronization acquisition using the frequency $f_2$ selected in the previous IMCRP procedure before the interval $O_6$.

As stated above, the present invention generates the minimum IMCRP only when the frequency reselection algorithm continues the degradation of the signal quality based on the change of the signal quality measured in each PLI. The present invention allows to perform the IMCRP operation more promptly by defining the state transition RESET region in consideration of the environment where the corresponding terminal suffers from the abrupt signal quality degradation. Also, the present invention minimizes the power consumption of the mobile terminal by preventing the unnecessary IMCRP by defining the good signal region.

FIG. 9 is a diagram for determining $CQ_{upper}$ and $CQ_{lower}$ according to an exemplary embodiment of the present invention. The parameter values $CQ_{upper}$ and $CQ_{lower}$ are determined by taking account of the travel speed of the terminal determined in a system level design of the corresponding system.

Referring to FIG. 9, PRX-MIN denotes Rx sensitivity of the terminal. That is, the PRX-MIN indicates the lowest level allowing the signal detection measured in the manufacturing process in every terminal. In general, the Rx sensitivity of the terminal is assumed to be RSSI=−95 dBm.

The outermost circle indicates an outage line based on the RX sensitivity of the terminal, and a location O indicates the base station of the corresponding cell. It is assumed that a maximum supportable terminal travel speed considered in the corresponding system is $V_{max}$. At this time, $CQ_{lower}$ is determined as the signal quality when the terminal moves at the speed of $V_{max}$ during one paging cycle toward the base station in the direction perpendicular to the tangent line determined at the location from a certain location of the outage line as shown in FIG. 9. For example, when the $CQ_{lower}$ is calculated using HATA large city path loss model, the following Equation 2 through Equation 5 can be utilized.

$$P=P_T+G_T-\{69.55+26.17 \log_{10}(f_{MHZ})-13.82 \log_{10}(h_b)-\alpha(h_m)+[44.9-6.55 \log_{10}(h_b)]\log_{10}(d_{km})+K\} \quad (2)$$

(Hata small/large city model, K=0, a(hm)=3.2[ log10 (11.75*hm)]2−4.97)

Herein, PT denotes a transmission power [dBm] of the base station, GT denotes a base station antenna gain, $f_{MHZ}$ denotes the MHz-based center frequency deployed in the corresponding network, and $h_m$ and $h_b$ denote an average height of the terminal and an average height of the base station assumed in the Hata model respectively. When the Rx sensitivity of the terminal is assumed to be $R_{min}$ using Equation 2, a distance D max from the base station to the outage line is calculated by applying the Hata model as expressed in the following Equation 3.

$$D_{max} = 10^{\frac{P_T + G_T - R_{min} - 69.55 - 26.16\log_{10}(f_{MHZ}) + 13.82\log_{10}(h_b) + a(h_m) + K}{44.9 - 6.55\log_{10}(h_b)}} \quad (3)$$

The maximum distance traveled by the terminal at the speed of $V_{max}$ during the paging cycle is given by the following Equation 4.

$$D_{PC}=V_{max}*\text{Paging Cycle} \quad (4)$$

Herein, DPC is the maximum distance traveled by the terminal during the paging cycle.

Based on Equation 3 and Equation 4, the distance D from the location PLOWER indicating the signal quality of $CQ_{lower}$ as indicated in FIG. 9 to the base station is determined as $D_{max}-D_{pc}$ [km]. At this time, $CQ_{lower}$ is calculated using the determined distance D as expressed in the following Equation 5.

$$P=P_T+G_T-\{69.55+26.16 \log_{10}(f_{MHZ})-13.82 \log_{10}(h_b)-\alpha(h_m)+[44.9-6.55 \log_{10}(h_b)]\log_{10}(D_{km})+K\} \quad (5)$$

Herein, P is the $CQ_{lower}$ using the Hata model and the maximum support terminal travel speed $V_{max}$.

An exemplary embodiment for obtaining the $CQ_{upper}$ using the $CQ_{lower}$ determined based on Equation 5 can use the offset. That is, the exemplary embodiment for obtaining the $CQ_{upper}$ using the $CQ_{lower}$ determined based on Equation 5 can adopt the offset concept. That is, $CQ_{upper}$ can be simply determined as $CQ_{upper}=CQ_{lower}+\alpha$. The calculated $CQ_{lower}$ and $CQ_{upper}$ values determine the dynamic state transition region in the operations of the present invention. In so doing, by using the supportable maximum terminal travel speed to calculate the $CQ_{lower}$ value, it is possible to minimize the probability of the paging loss caused when the terminal gets out of the outage line of the corresponding cell due to the movement of the terminal during one paging cycle.

FIG. 10 illustrates the terminal apparatus for reducing the power consumption of the terminal when the terminal operates in the idle mode in the wireless communication system.

Referring to FIG. 10, the terminal includes an OFDM receiver 1000, a signal quality measurer 1010, a controller 1020, and an OFDM transmitter 1030.

The OFDM receiver 1000 down-converts an RF band signal received via an antenna to a baseband signal, divides the baseband signal base on OFDM symbols, removes CP, and restores complex symbols mapped to a frequency domain through Fast Fourier Transform (FFT) operation. The OFDM receiver 1000 classifies the complex symbols mapped to the frequency domain based on the processing unit. For example, the OFDM receiver 1000 extracts a preamble signal and a pilot signal used for the channel quality measurement, extracts a signal of a control message, and provides to the controller 1020 and the signal quality measurer 1010.

The signal quality measurer 1010, under control of the controller 1020, measures the signal quality during each PLI and provides the result to the controller 1020. The signal quality can be determined to one of Received Signal Strength Indication/Indicator (RSSI), Carrier-to Interference-plus-Noise-Ratio (CINR), Path Loss (PL), Signal-to-Interference-plus-Noise-Ratio (SINR), and Ec/No. For example, the signal quality measurer 1010 determines the RSSI and the CINR or the SINR through the pilot signal or the preamble signal from the OFDM receiver 1000.

The controller 1020 controls overall operations of the terminal, particularly, according to the present invention, efficiently controls the power consumption of the terminal in the power saving operation. For doing so, the controller 1020 includes a first determiner 1021, a frequency selector 1022, a second determiner 1023, and a state manager 1024.

The first determiner 1021 functions to acquire the synchronization to select the PBS through the frequency of the base station selected before each PLI, or through the frequency selected from the multiple frequencies at the end of the previous PLI. In so doing, the time taken to acquire the synchronization (or the wake-up interval) is determined based on the signal quality measured by the signal quality measurer 1010.

The state manager 1024 compares CQPLIk−1 and CQPLIk values and manages the state transition for determining the frequency reselection based on the result. The state transition is divided into the good signal region, the dynamic state transition region, and the state transition reset region.

That is, in the good signal region, the state manager 1024 sets the next state value to S0. In the dynamic state transition region, the state manager 1024 changes the next state $S_n \rightarrow S_{n-1}$ or $S_n \rightarrow S_{n+1}$ according to the comparison result of $CQPLI_{k-1}$ and $CQPLI_k$. Lastly, in the state transition reset region, the state manager 1024 sets the next state value to $S_{MAX}$.

According to the state transition result of the state manager 1024, the frequency selector 1022 scans some or all of the frequencies defined in the corresponding network and outputs the frequency of the best signal quality and the signal quality. In so doing, the state manager 1024 returns the state value to the S0 state.

The second determiner 1023 determines and outputs the length 0k+1 of the overhead interval to apply to the next $PLI_{k+1}$ according to the $CQPLI_k$ value. Yet, the initial value $O_0$ of the overhead interval is determined based on the signal quality of the base station to which the corresponding performs the signaling to enter the idle mode.

The OFDM transmitter 1030 receives the control message and data from the controller 1020, maps the complex symbols constituting the frame to the frequency domain according to a defined rule, converts the complex symbols mapped to the frequency domain to a time-domain signal through Inverse Fast Fourier Transform (IFFT) operation, and forms OFDM symbols by inserting a Cyclic Prefix (CP). The OFDM transmitter 1030 up-converts the OFDM symbols to an RF band signal and transmits via the antenna.

While the present invention exemplifies the reduction of the power consumption when the terminal operates in the idle mode, the present invention is applicable in the sleep mode operation. The idle mode and sleep mode operations are referred to as the power saving.

As set forth above, the terminal operating in the idle mode can minimize the power consumption of the terminal through the efficient control of the synchronization acquisition overhead interval and the frequency reselection algorithm carried out based on and the channel change. Also, by determining the lower bound CQlower of the dynamic state transition region using the maximum terminal travel speed supported by the corresponding system, the paging loss in the paging listen interval can be reduced efficiently.

Therefore, the present invention can achieve the effects that the paging detection performance of the terminal is not deteriorated and concurrently the terminal life time is increased.

Although the present disclosure has been described with an exemplary embodiment, various changes and modifications may be suggested to one skilled in the art. It is intended that the present disclosure encompass such changes and modifications as fall within the scope of the appended claims

The invention claimed is:

1. A method for an operation of a terminal in a wireless communication system, the method comprising:
   determining a quality of a first paging signal received in a first paging listen interval;
   determining, based on the quality of the first paging signal, a length of a wake-up period where the terminal performs a synchronization with a base station, the wake-up period comprised in a paging unavailable interval; and
   receiving, based on performing the synchronization with the base station during the wake-up period having the determined length, a second paging signal in a second paging listen interval from the base station.

2. The method of claim 1, wherein the determining the length of the wake-up period based on the quality of the first paging signal comprises:
   comparing the quality of the first paging signal received in the first paging listen interval and a quality of a previous paging signal received in a previous paging listen interval; and
   selecting one of a plurality of predefined wake-up periods based on the comparison result.

3. The method of claim 1, further comprising:
   determining whether to change a state transition region based on the quality of the first paging signal,
   wherein the determining whether to change the state transition region comprises:
      when the quality of the first paging signal received in the first paging listen interval is greater than or equal to a first threshold, storing a value for the quality of the first paging signal received in the first paging listen interval without reselecting a frequency;
      when the quality of the first paging signal received in the first paging listen interval is less than a second threshold, reselecting the frequency and storing the value for the quality of the first paging signal received in the first paging listen interval; and
      when the quality of the first paging signal received in the first paging listen interval is greater than the second threshold and less than the first threshold, changing to a dynamic state transition region by comparing the quality of the first paging signal received in the first paging listen interval and a quality of a previous paging signal received in a previous paging listen interval.

4. The method of claim 3, wherein the first threshold is a maximum value of a quality of a paging signal with the state transition region, and the second threshold is a minimum value of the quality of the paging signal with the state transition.

5. The method of claim 4, wherein the second threshold is determined based on a maximum terminal travel speed and a terminal travel distance during a paging cycle, and the first threshold is determined as an offset of a second offset.

6. The method of claim 3, wherein the changing to the dynamic state transition region by comparing the quality of the first paging signal received in the first paging listen interval and the quality of the previous paging signal received in the previous paging listen interval,
   changes $S_n \rightarrow S_{n-1}$ when the quality of the first paging signal received in the first paging listen interval is greater than or equal to the quality of the previous paging signal received in the previous paging listen interval, and
   changes $S_n \rightarrow S_{n31\ 1}$ when the quality of the first paging signal received in the first paging listen interval is less than the quality of the previous paging signal received in the previous paging listen interval,
   wherein the $S_n$, as a current state transition region, is an n-th transition state, $S_{n+1}$ is an n+1-th transition state region, and $S_{n-1}$ is an n−1-th transition state region.

7. The method of claim 6, wherein, when the $S_{n+1}$ is a maximum transition state region, the frequency is reselected.

8. The method of claim 1, determining the length of the wake-up period comprises:

if a value for indicating the determined quality is greater than a reference value, changing the length of the wake-up period from a first value to a second value greater than the first value; and if the value is less than or equal to the reference value, changing the length of the wake-up period from the first value to a third value less than the first value.

9. A method for an operation of a terminal in a wireless communication system, the method comprising:
determining a quality of a first paging signal received in a first paging listen interval;
determining, based on the quality of the first paging signal, a length of a wake-up period where the terminal performs a synchronization with a base station, the wake-up period comprised in a paging unavailable interval;
selecting a frequency to use in a second paging listen interval based on the quality of the first paging signal; and
receiving, based on performing the synchronization with the base station during the wake-up period having the determined length, a second paging signal in the second paging listen interval from the base station.

10. The method of claim 9, wherein the determining the length of the wake-up period based on the quality of the first paging signal comprises:
comparing the quality of the first paging signal received in the first paging listen interval and a quality of a previous paging signal received in a previous paging listen interval; and
selecting one of a plurality of predefined wake-up periods based on the comparison result.

11. The method of claim 9, wherein the selecting the frequency to use in the second paging listen interval based on the quality of the first paging signal comprises:
when the quality of the first paging signal received in the first paging listen interval is greater than or equal to a first threshold, storing a value for the quality of the first paging signal received in the first paging listen interval without reselecting another frequency;
when the quality of the first paging signal received in the first paging listen interval is less than a second threshold, reselecting the another frequency and storing the value for the quality of the first paging signal received in the first paging listen interval; and
when the quality of the first paging signal received in the first paging listen interval is greater than the second threshold and less than the first threshold, changing to a dynamic state transition region by comparing the quality of the quality of the first paging signal received in the first paging listen interval and a quality of a previous paging signal received in a previous paging listen interval.

12. The method of claim 11, wherein the first threshold is a maximum value of a quality of a paging signal with a state transition region, and the second threshold is a minimum value of the quality of the paging signal with the state transition region.

13. The method of claim 12, wherein the second threshold is determined based on a maximum terminal travel speed and a terminal travel distance during a paging cycle, and the first threshold is determined as an offset of a second offset.

14. The method of claim 9, wherein the wake-up period is a time period required in a synchronization process.

15. A terminal in a wireless communication system, the terminal comprising:
a transceiver; and
at least one processor configured to:
determine a quality of a first paging signal received in a first paging listen interval;
determine, based on the quality of the first paging signal, a length of a wake-up period where the terminal performs a synchronization with a base station, the wake-up period comprised in a paging unavailable interval; and
receive, based on performing the synchronization with the base station during the wake-up period having the determined length, a second paging signal in a second paging listen interval from the base station.

16. The terminal of claim 15, wherein to determine the length of the wake-up period based on the quality of the first paging signal, the at least one processor is configured to:
compare the quality of the first paging signal received in the first paging listen interval and a quality of a previous paging signal received in a previous paging listen interval; and
select one of a plurality of predefined wake-up periods based on the comparison result.

17. The terminal of claim 15, wherein the at least one processor is further configured to determine whether to change a state transition region based on the quality of the first paging signal by:
when the quality of the first paging signal received in the first paging listen interval is greater than or equal to a first threshold, storing a value for the quality of the first paging signal received in the first paging listen interval without reselecting a frequency;
when the quality of the first paging signal received in the first paging listen interval is less than a second threshold, reselecting the frequency and storing the value for the quality of the first paging signal received in the first paging listen interval; and
when the quality of the first paging signal received in the first paging listen interval is greater than the second threshold and less than the first threshold, changing to a dynamic state transition region by comparing the quality of the first paging signal received in the first paging listen interval and a quality of a previous paging signal received in a previous paging listen interval.

18. The terminal of claim 17, wherein the first threshold is a maximum value of a quality of a paging signal with the state transition region, and the second threshold is a minimum value of the quality of the paging signal with the state transition.

19. The terminal of claim 18, wherein the second threshold is determined based on a maximum terminal travel speed and a terminal travel distance during a paging cycle, and the first threshold is determined as an offset of a second offset.

20. The terminal of claim 15, wherein the at least one processor is configured to control to:
if a value for indicating the determined quality is greater than a reference value, changing the length of the wake-up period from a first value to a second value less than the first value; and
if the value is less than or equal to the reference value, changing the length of the wake-up period from the first value to a third value greater than the first value.

* * * * *